Patented Apr. 1, 1941

2,236,516

UNITED STATES PATENT OFFICE 2,236,516

ESTERS OF HYDROXY POLYCARBOXYLIC ACID DERIVATIVES

Frank J. Cahn and Benjamin R. Harris, Chicago, Ill., assignors to The Emulsol Corporation, Chicago, Ill., a corporation of Illinois No Drawing. Application November 30, 1938, Serial No. 243,120

24 Claims. (Cl. 260—410)

This invention relates to the preparation of water-soluble or water-dispersible chemical compounds which are characterized by possessing interface modifying properties rendering the same highly useful for the purposes hereinafter set forth.

An important object of the invention resides in the provision of a novel and effective method of producing the chemical compounds with which the present invention is concerned.

Another and important object is the preparation of certain chemical compounds having the useful properties described hereinafter in detail.

Other objects will become apparent in the light of the following detailed description of the invention.

In general, the new and useful compounds and reaction products of the present invention are most suitably prepared by reacting a lower molecular weight carboxylic acid ester of an anhydride of an hydroxypolycarboxylic acid with an alcohol containing at least four carbon atoms and preferably from eight to eighteen carbon atoms. By way of illustration, this may be exemplified by reacting the acetic acid ester of citric acid anhydride with lauryl alcohol. In addition to the novelty of the method, the reaction products produced herein have never been disclosed heretofore and, therefore, their utility for the purposes hereinafter described has been unknown.

While many of the novel products of the present invention may best be defined in the form of reaction products, they and particularly some of the more potent constituents thereof can, at least in part, be characterized or described by way of structural formulae. Illustrative examples of such compounds which fall within the scope of the invention are as follows:

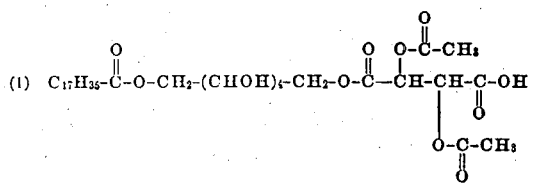

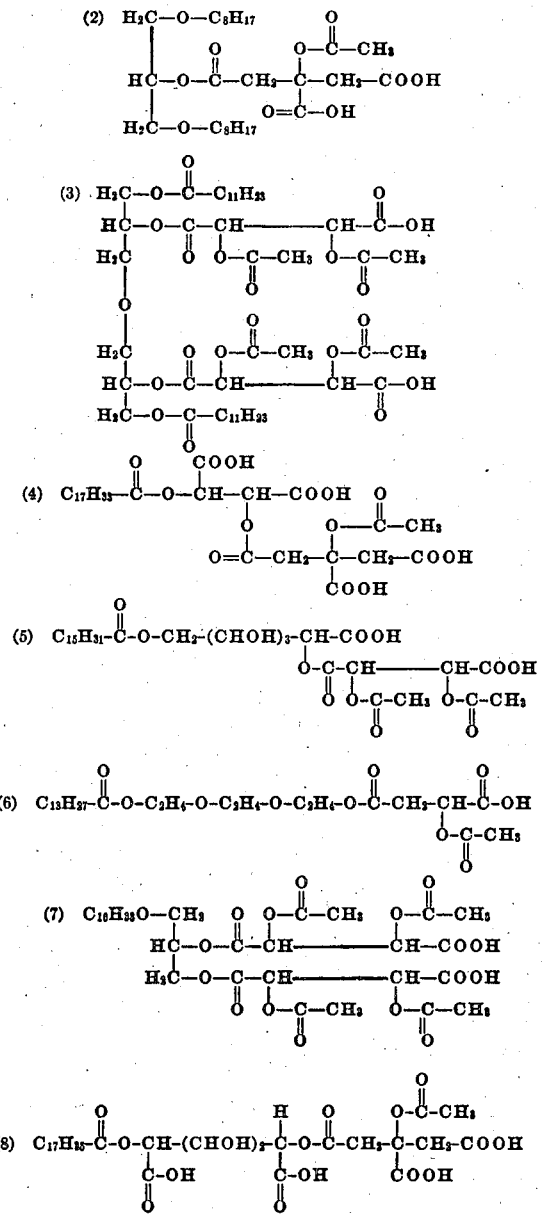

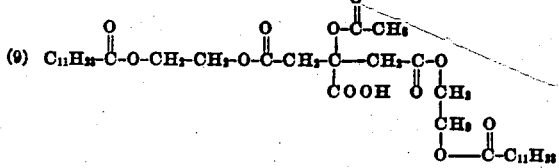

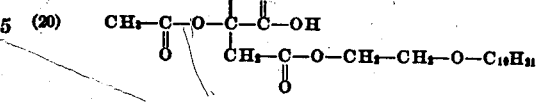

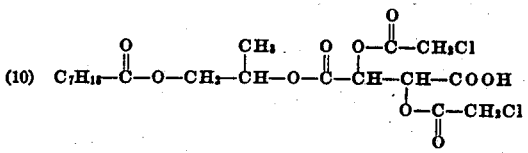

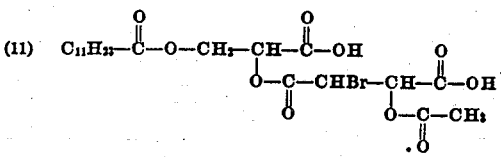

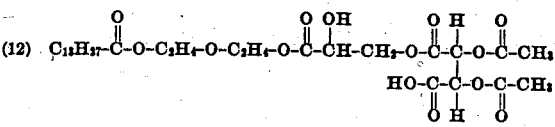

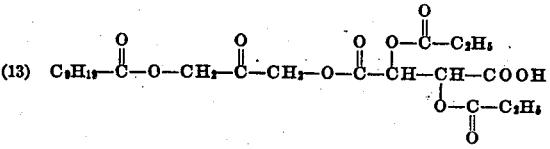

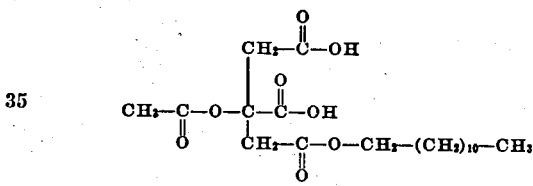

In order that the full significance of the invention may be made even more apparent, the following illustrative examples are set forth. It will be appreciated that the proportions of reacting ingredients, times of reaction, temperatures of reaction, and the like may be varied and that supplementary processes of purification and the like may be resorted to wherever found desirable or convenient. These and other variations and modifications will be evident to those skilled in the art in the light of the guiding principles which are disclosed herein.

*Example A*

3.72 parts by weight of commercial lauryl alcohol and 4.32 parts by weight of the acetic acid ester of citric acid anhydride were heated to 100 degrees C. with stirring until practically all of said anhydride went into solution. The resulting reaction product, having at least a substantial amount of a compound of the probable formula

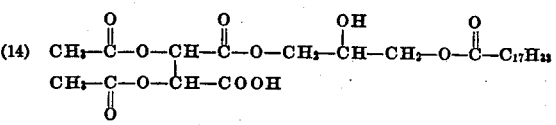

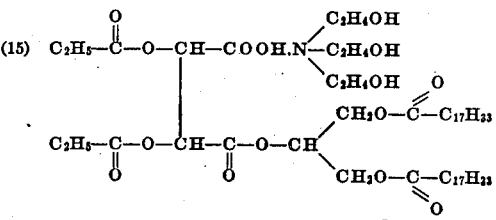

lowered the surface tension of water and dispersed readily in water and foamed well. On neutralization with caustic soda, caustic potash or amines such as triethanolamine, the foaming properties increased. The product possessed useful properties as an anti-spattering agent in margarine and served to improve chocolate and confections in the same general way as described in Harris Patent No. 2,025,986.

*Example B*

12.65 parts by weight of di-acetic acid ester of tartaric acid anhydride and 10.6 parts by weight of commercial lauryl alcohol were heated to 100 degrees C. with stirring. After several minutes at this temperature, the anhydride went into solution. The resulting reaction product, having at least a substantial amount of a compound of the probable formula

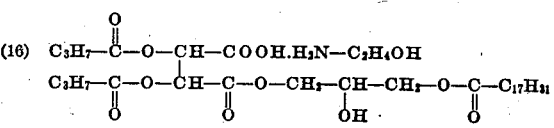

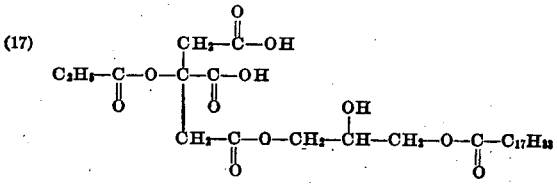

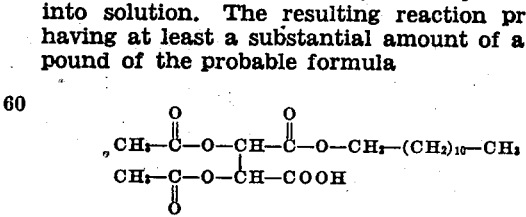

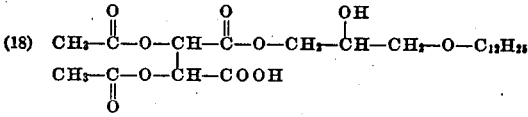

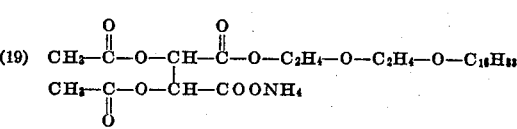

foamed slightly in dilute acid solution and strongly in dilute alkali solution. The product is a substantially odorless transparent syrup with a faintly bitter taste. On heating at 110 degrees C. for 1 hour, the bitter taste was eliminated. The product may be partially or completely neutralized with any of the alkaline reacting materials mentioned hereinafter. Its properties are generally similar to those of Example A.

Example C 10.05 parts by weight of di-acetic acid ester of tartaric acid anhydride and 12.5 parts by weight of monolaurin (containing 0.2% free fatty acid) were heated at 100 degrees C. with stirring, about 10 minutes being required for a homogeneous solution to form. The resulting product, having at least a substantial amount of a compound of the probable formula

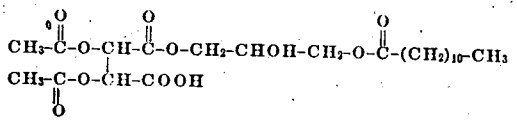

was a transparent syrup the viscosity of which increased on prolonged heating. It foamed in acid solution. Upon neutralization, the foaming properties increased. It possessed excellent surface modifying properties adapting it for various of the uses hereinafter described.

In place of di-acetic acid ester of tartaric acid anhydride, the acetic acid ester of citric acid anhydride may be employed. Furthermore, instead of monolaurin, the monolauric acid ester of diethylene glycol may be used. These and other substitutions are disclosed in detail hereinafter and apply to the present example as well as the other examples.

Example D 25.55 parts by weight of a product comprising mainly the monolauric acid ester of diglycerol were reacted at 150 degrees C. with stirring for several minutes with 16.0 parts by weight of distilled di-acetic acid ester of tartaric acid anhydride. The resulting reaction product comprised a substance with the following probable formula and foamed in aqueous media:

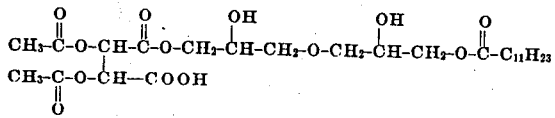

The above reaction was also carried out with equal parts by weight of monocaprylin and di-acetic acid ester of tartaric acid anhydride. A product resulted having properties generally similar to those of Example C.

Example E 9.5 parts by weight of propylene glycol monolaurate and 7.8 parts by weight of distilled di-acetic acid ester of tartaric acid anhydride were heated at 140 degrees C. with stirring for approximately 15 minutes. The reaction product, which had foaming properties, contained at least a substantial amount of a chemical compound having the following probable formula:

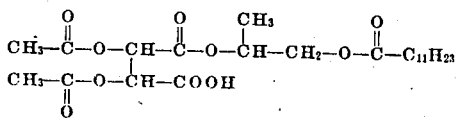

Example F 7.85 parts by weight of ethylene glycol monolaurate and 7.0 parts by weight of di-acetic acid ester of tartaric acid anhydride were heated at 150 degrees C. with stirring for approximately 5 minutes. The resulting reaction product was then neutralized with dilute caustic soda solution. It possessed foaming and wetting properties and contained at least a substantial amount of a compound having the probable following formula:

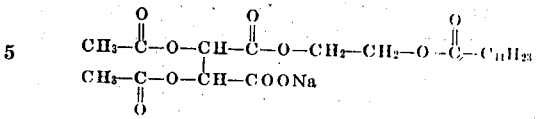

Example G 5.65 parts by weight of normal octyl alcohol and 9.5 parts by weight di-acetic acid ester of tartaric acid anhydride were heated at 150 degrees C. with stirring for approximately 5 minutes and then the reaction product was neutralized with caustic soda. The reaction product foamed, did not precipitate in the presence of calcium ions, and contained a substantial amount of a product having the following probable formula:

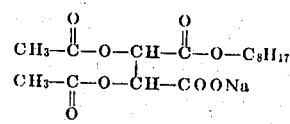

Example H 13.45 parts by weight of castor oil and 9.2 parts by weight of di-acetic acid ester of tartaric acid anhydride were heated at 160 degrees C. with stirring for several minutes. The product was then neutralized with caustic soda. It was water-soluble and had good foaming properties.

Example I 6.65 parts by weight of monostearin and 8.0 parts by weight of di-acetic acid ester of tartaric acid anhydride were heated at 160 degrees C. with stirring for several minutes. The product had good foaming properties and also reduced the spattering of margarine.

Example J 319 parts by weight of di-olein and 130 parts by weight of di-acetic acid ester of tartaric acid anhydride were heated at 170 degrees C. with agitation by means of a stream of carbon dioxide gas for 10 minutes. The product had good emulsifying properties.

Example K 237 parts by weight of a product consisting substantially of mono-olein and 144 parts by weight of di-acetic acid ester of tartaric acid anhydride were heated slowly up to 150 degrees C. while passing a stream of carbon dioxide gas therethrough and the reaction mass was kept at such temperatures for about 5 minutes. The reaction product was a pale yellow viscous syrup and had excellent emulsifying and dispersing properties.

Example L 389 parts by weight of the mono-cetyl ether of diglycerol and 216 parts by weight of di-acetic acid ester of tartaric acid anhydride were heated with stirring at 155 degrees C. for 10 minutes. The reaction product exhibited good emulsifying and dispersing properties.

Instead of reacting the anhydrides of acetic acid esters of citric and tartaric acids and the like with alcohols, it is also possible to react said anhydrides with amines and amides such as hexyl amine, octyl amine, lauryl amine, stearyl amine, lauramide, stearamide, and the like to produce new and useful products. An example of such procedure comprises heating 7.5 parts by weight of commercial n-1 laurylamine with 10 parts by weight of distilled di-acetic acid ester of tartaric acid anhydride at 140 degrees C. for several minutes. The resulting product, a brown syrup, foams strongly when neutralized to phenolphthalein with caustic soda and is stable in the presence of calcium ions. The reaction product comprises

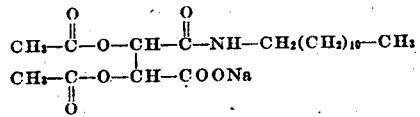

The reaction products of the present invention may be reacted with various alcohols such as butyl alcohol, octyl alcohol, lauryl alcohol, cetyl alcohol, oleyl alcohol, stearyl alcohol, as well as derivatives of polyhydroxy substances such as monostearin, monolaurin, mono-olein, di-laurin, di-olein, mono-cetyl ether of glycerol, diethylene glycol mono-oleate, diethylene glycol monolaurate, and other alcohols such as those described hereinafter to produce reaction products having valuable properties. The reaction in such cases appears to be one of esterification between free carboxyl groups of the products hereinabove described and hydroxy groups of the alcohols. If desired, the free carboxyl groups may be converted to acyl halides and then reacted with the alcohols. The reaction may be accelerated by the use of the usual condensing agents such as sulphuric acid, chlorsulphonic acid, and the like. Such reactions may also be carried out between the products of the present invention, as described in the various examples listed hereinabove, and the products described in the application of Benjamin R. Harris, Serial No. 243,099, filed November 30, 1938. Particularly valuable products result from the interaction between the products of the present invention, as described in the various examples listed hereinabove, and such compounds as the mono-tartaric acid acid ester of glycerin, the mono-citric acid esters of ethylene glycol and diethylene glycol, the ester resulting from one mol of glycerin and two mols of tartaric acid, and, in general, the water-soluble and water-dispersible esters of aliphatic polyhydroxy substances with polycarboxylic and hydroxypolycarboxylic acids. Such esters are disclosed as intermediate products in the preparation of the compounds disclosed in the aforementioned application of Benjamin R. Harris.

The hydroxy polycarboxylic acid anhydrides whose acetic acid esters and similar derivatives are reacted with alcohols, amides, amines, and the like, in accordance with the present invention may be selected from a large group including, for example, citric acid, tartaric acid, malic acid, hydroxy methylsuccinic acid, trihydroxyglutaric acid, mucic acid, saccharic acid, and the mono- and poly-hydroxy derivatives of adipic acid, pimelic acid, suberic acid, azelaic acid, sebacic acid, and the like. It is preferred to employ the acetic acid esters or like derivatives of the anhydrides of those hydroxy polycarboxylic acids which are water-soluble and of aliphatic character. These acids may contain other substituents such as CN, NH$_2$, NO$_2$, F, Cl, Br, I, SO$_3$H, phosphate, sulphate, SCN, etc. Of particular importance are citric and tartaric acids.

In place of the acetic acid ester derivatives of the anhydrides of the hydroxy polycarboxylic acids, we may employ any carboxylic acid derivative, preferably water-soluble and of aliphatic or fatty character and particularly containing not more than six carbon atoms although the invention is not so limited. Examples of such derivatives are those from propionic acid, butyric acid, valeric acid, maleic acid, succinic acid, and the like. Of particular utility, however, are the acetic acid ester derivatives.

The alcohols which are reacted with the acetic acid esters of the hydroxy polycarboxylic acid anhydrides may be selected from a large group including aliphatic straight chain and branched chain alcohols such as butyl alcohol, amyl alcohol, hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, high-molecular weight glycols such as cetene glycol and other vicinal glycols; 1,10 dihydroxyoctadecane, 1,10 dihydroxyoctadecene, and the like; branched chain octyl, decyl, dodecyl, tetradecyl, hexadecyl and octadecyl aliphatic alcohols as, for example, 2-ethyl hexanol-1, 2-n butyl octanol-1, 2-butyl tetra-decanol-1, and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols which may be employed are the cyclo-aliphatic or alicyclic alcohols such as the sterols, as, for example, cholesterol, iso-cholesterol, phytosterol, sitosterol, hydroaromatic alcohols such as abietol, and such unsaturated alcohols as linalool, citronellol, geraniol and the like and hydrogenated products of the foregoing. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, i-hydroxy-stearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like. Still other alcohol molecules are the carboxylic acid amides of alkylolamines such as lauric acid amide of monoethanolamine, oleic acid amide of mono-propanolamine, and the like.

The term "alcohols," as employed herein, is intended to include alcohols which may or may not contain other groups such as carboxylic, carbonyl, cyanogen, sulphone, sulphoxide, halogen, amine, amide, sulphonic, sulphate, or other radicals.

The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the compounds of the present invention may be produced. As examples of such alcohols may be mentioned partially esterified or partially etherified mono-, di-, and poly-saccharides, and sugar alcohols such as monolauric acid ester of sucrose, monostearic acid ester of dextrose, monopalmitic acid ester of sorbitol, monolauryl ether of pentaerythritol, monolauric acid ester of pentaerythritol, and the like; the monoglycerides and diglycerides, preferably of the higher fatty acids, including, for example, monoacetin, dibutyrin, monolaurin, monomyristin, monostearin, mono-olein, distearin, diolein, dicaproin, monolauryl ether of glycerol, mono-oleyl ether of glycerol, monocetyl ether of glycerol, dicetyl ether of glycerol, monostearyl ether of glycerol, monostearic acid ester of diethylene glycol, monolauric acid ester of ethylene glycol, monolauric acid ester of triethanolamine, monostearic acid ester of tripropanolamine, and the like. The aliphatic polyhydroxy substance which is partially esterified or etherified to provide one of the reacting constituents herein may be selected from a large class and includes, among those mentioned, glycerol; glycols such as ethylene glycol, propylene glycol, trimethylene glycol, butylene glycol and the like; polyglycols such as diethylene glycol; pentaerythritol; quercitol; dihydroxy acetone; triethanolamine; tripropanolamine; polyglycerols such as diglycerol, triglycerol, tetraglycerol and the like including mixtures thereof; carbohydrates and sugars including mono, di- and polysaccharides, such as dextrose, sucrose, xylose arabinose, galactose, fructose, maltose, mannose, dextrin, starch, and the like; the natural and synthetic, simple and complex glucosides; sugar alcohols such as arabitol, mannitol, sorbitol and dulcitol; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as, for example:

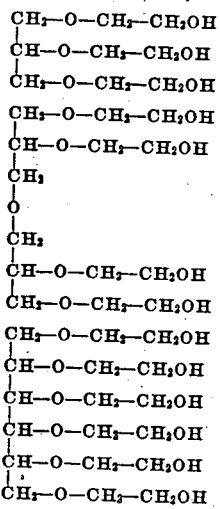

(For convenience, all hydroxyl groups are written facing one way.) In general, this type of alcohol may be represented by the formula $$(RO)_v—X—(OH)_w$$

wherein R is a radical selected from the group consisting of alkyl, cyclo-alkyl, aryl, aralkyl, and acyl, and substitution products thereof, X is the residue of the aliphatic polyhydroxy substance, and $v$ and $w$ are small whole numbers.

It is, of course, obvious that the alcohols from which the compounds disclosed herein may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols or their derivatives may be utilized in the preparation of the compounds as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$. Again, mixtures of alcohols such as are present in the so-called sperm oil alcohols, as well as those present in wool-fat, may efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

The reaction products may be used as such or they may be neutralized, in whole or in part, with suitable anti-acid materials. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium, magnesium, ammonium, and zinc oxides, hydroxides, and salts, potassium stearate, sodium stearate, and the like; organic nitrogenous bases such as primary, secondary and tertiary amines including alcohol-, alkylol-, and aralkylol-amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl monoethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl monoethanolamine, 1-amino-2, 3-propanediol, 1,2-diamino-propanol; alkylamines such as ethylamine, propylamine, laurylamine, cetylamine, butylamine, hexylamine, cyclohexylamine, aniline, toluidines, dimethylamine, diethylamine, N-methyl-N-ethyl amine, triethylamine, trimethylamine, ethylene diamine, diethylene triamine, triethylene tetra-amine, betaine, monomethyl ethylene diamine, monoethyl diethylene tetra-amine, mono-allyl amine, hydrazine and substituted hydrazine, aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrrolidines, nicotine, and homologues and derivatives or substitution products thereof, and, in general, primary, secondary and tertiary amines substituted or not with other radicals, such as hydroxy, alkyl, aryl, cycloalkyl groups and the like; quaternary ammonium bases or hydroxides such tetramethyl ammonium hydroxide, tetra-ethyl ammonium hydroxide, quaternary ammonium bases with dissimilar alkyl radicals such as methyl-triethyl ammonium hydroxide, propyl trimethyl ammonium hydroxide; mixtures of any two or more of said bases as, for example, in the case of commercial triethanolamine which contains minor proportions of mono- and di-ethanolamine; proteins and partial digestion or hydrolysis products thereof. It will be understood that these substituted ammonium compounds or organic nitrogenous bases may be utilized in pure, impure, or commercial form.

It will be understood that by the term "cation", as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, alkylolamine, or other soluble salts.

It will be seen, from a consideration of the numerous examples listed hereinabove, that the chemical compounds fall into two distinct categories, namely, (1) those wherein the acetic acid esters of tartaric acid anhydride or the like are reacted with simple alcohols such as the monohydric alcohols like octyl alcohol, lauryl alcohol, oleyl alcohol and the like, and (2) those wherein the acetic acid esters of tartaric acid anhydride or the like are reacted with complex alcohols such as derivatives of polyhydroxy substances, like monostearin, mono-olein, di-olein, mono-cetyl ether of glycerol, mono-cetyl ether of diglycerol, and the like. The compounds falling into this last-mentioned category are particularly satisfactory and constitute an especially important phase of the present invention.

The compounds of our invention have utility in various arts in which interface modifying agents are employed. Many of them are resistant to precipitation by calcium and magnesium salts and are compatible with acid and alkali media. They may be utilized in washing and laundering and in the textile and related industries wherein they function for wetting, lathering, detergent, emulsifying, penetrating, dispersing, frothing and foaming purposes. The textiles, various treatments of which in the presence of the agents of the present invention is rendered effective, comprise natural products such as cotton, wool, linen and the like as well as the artifically produced fibres, (and fabrics) such as rayon, cellulose acetates, cellulose ethers and similar artificial silk fabrics. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents of my invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. Many of them may also be used with effect in the preparation of metal and furniture polishes, shoe polishes, in rubber compositions, for breaking or demulsifying petroleum emulsions such as those of the water-in-oil type which are encountered in oil-field operations, and with advantage in place of lecithin in chocolate and other confections as well as in paints and the like, and for various other purposes which will readily occur to those versed in the art in the light of my disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood, that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like Many of said products may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulphoacetate, dioctyl sodium sulpho-succinate, dilauryl potassium sulpho-glutarate, lauryl monoethanolamine sulpho-acetate, and the like; sulphuric and sulphonic derivatives of condensation products of alkylolamines and higher fatty acids; reaction products of phosphoric, pyrophosphoric, meta-phosphoric, tetraphosphoric, and polyphosphoric acids with higher molecular weight alcohols; Turkey-red oils; compounds of the type of isopropyl naphthalene sodium sulphonate, and other classes of wetting agents.

It will be understood that the compounds need not be utilized in the pure state. Indeed, in most instances it will be found to be more convenient and commercially desirable to employ them in the form of their reaction mixtures with or without the addition of diluents. It will also be understood that mixtures of any one or more of the reacting constituents may be employed in producing the products hereof and this is particularly the case where commercial supplies of the chemicals are utilized; and, in addition, any of the esters of the hydroxy polycarboxylic acid anhydrides listed above may be reacted with any of the alcohols described.

The term "higher", as used herein and in the claims to describe carboxylic and fatty acids, alcohols, and the like, will be understood to mean at least six carbon atoms unless otherwise specifically stated.

The term "poly" wherever used herein will be understood to be employed in its usual sense, namely, to denote two or more.

What we claim as new and desire to protect by Letters Patent of the United States is:

1. A process of preparing new chemical compounds which comprises reacting an alcohol containing at least four carbon atoms with a carboxylic acid ester of an aliphatic hydroxy polycarboxylic acid anhydride.

2. A process which comprises reacting an aliphatic alcohol containing at least four carbon atoms with a lower molecular weight aliphatic carboxylic acid ester of an aliphatic hydroxy polycarboxylic acid anhydride to produce reaction products comprising chemical compounds containing at least one unesterified carboxyl group in their molecules.

3. A process of preparing new chemical compounds which comprises reacting an aliphatic alcohol containing at least four carbon atoms with a lower molecular weight aliphatic carboxylic acid ester of a water-soluble aliphatic hydroxy polycarboxylic acid anhydride.

4. A process of preparing new chemical compounds which comprises reacting an aliphatic alcohol containing from eight to eighteen carbon atoms with a lower molecular weight fatty acid ester of a water-soluble aliphatic hydroxy polycarboxylic acid anhydride.

5. A process of preparing new chemical compounds which comprises reacting an alcohol containing from eight to eighteen carbon atoms with a lower molecular weight aliphatic mono-carboxylic acid mono ester of a water-soluble aliphatic hydroxy polycarboxylic acid anhydride.

6. A process of preparing new chemical compounds which comprises reacting an alcohol containing at least four carbon atoms with an acetic acid ester of an aliphatic hydroxy-polycarboxylic acid anhydride.

7. A process of preparing new chemical compounds which comprises reacting an aliphatic alcohol containing from eight to eighteen carbon atoms with a water-soluble acetic acid ester of an aliphatic hydroxy-polycarboxylic acid anhydride.

8. A process of preparing new chemical compounds which comprises reacting lauryl alcohol with a water-soluble acetic acid ester of an aliphatic hydroxy-polycarboxylic acid anhydride.

9. A process of preparing new chemical compounds which comprises reacting an alcohol having at least eight carbon atoms with a member selected from the group consisting of acetic acid esters of anhydrides of tartaric acid and citric acid.

10. A process in accordance with claim 9 wherein the alcohol comprises a member selected from the group consisting of partial esters and partial ethers of polyhydric alcohols.

11. A process of preparing new chemical compounds which comprises reacting a lower molecular weight carboxylic acid ester of an aliphatic hydroxy polycarboxylic acid anhydride with a compound having the general formula $$(RO)_v-X-(OH)_w$$

wherein R is a radical selected from the group consisting of alkyl, cyclo-alkyl, aralkyl, aryl, and acyl, and substitution products theerof, X is the residue of an aliphatic polyhydroxy substance, and $v$ and $w$ are small hole numbers.

12. A process in accordance with claim 11 wherein an acetic acid ester of a water-soluble aliphatic hydroxy-polycarboxylic acid anhydride.

13. From water-soluble to water-dispersible chemical compounds comprising reaction products of carboxylic acid esters of aliphatic hydroxy polycarboxylic acid anhydrides and a member selected from the group consisting of higher molecular weight aliphatic partial ethers and partial esters of aliphatic polyhydoxy substances, the higher molecular weight aliphatic radical containing at least eight carbon atoms.

14. From water-soluble to water-dispersible chemical compounds containing at least one carboxyl group in their molecules and comprising reaction products of lower molecular weight aliphatic carboxylic acid esters of aliphatic hydroxy polycarboxylic acid anhydrides and a member selected from the group consisting of higher molecular weight partial ethers and partial esters of aliphatic polyhydroxy substances, the higher molecular weight radical containing at least six carbon atoms.

15. From water-soluble to water-dispersible chemical compounds in accordance with the general formula

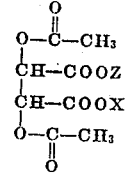

wherein Z is the radical of a member selected from the group consisting of higher molecular weight aliphatic partial ethers and partial esters of aliphatic polyhydroxy substances, and X is a cation, the higher molecular weight radical containing at least six carbon atoms.

16. From water-soluble to water-dispersible chemical compounds comprising reaction products of acetic acid esters of aliphatic hydroxy polycarboxylic acid anhydride and a member selected from the group consisting of higher molecular weight fatty acid partial esters of aliphatic polyhydroxy substances selected from the group consisting of glycerol, glycols, polyglycerols, polyglycols, sugars, sugar alcohols, and hydroxycarboxylic acids, the higher molecular weight fatty acid radical containing at least eight carbon atoms.

17. From water-soluble to water-dispersible chemical compounds in accordance with the general formula

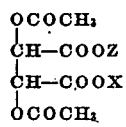

wherein Z is the radical of a member selected from the group consisting of partial ethers and partial esters of aliphatic polyhydroxy substances, and X is a cation.

18. From water-soluble to water-dispersible chemical compounds corresponding to those resulting from the interaction of acetic acid esters of aliphatic hydroxy polycarboxylic acid anhydrides with higher molecular weight fatty acid monoglycerides, the higher molecular weight radical containing at least six carbon atoms.

19. From water-soluble to water-dispersible chemical compounds comprising esters of normal primary alcohols containing a chain of at least eight carbon atoms with the acetic acid ester of citric acid, and salts thereof.

20. The mono-ester of lauryl alcohol with the acetic acid ester of citric acid and salts thereof.

21. Esters of oleic acid in accordance with the general formula

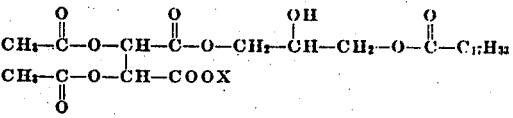

wherein X is a cation.

22. From water-soluble to water-dispersible chemical compounds comprising esters of lower molecular weight carboxylic acid esters of aliphatic hydroxy polycarboxylic acids with normal primary alcohols containing a chain of at least eight carbon atoms.

23. From water-soluble to water-dispersible chemical compounds comprising esters of lower molecular weight carboxylic acid esters of aliphatic hydroxy polycarboxylic acids with compounds selected from the group consisting of higher molecular weight aliphatic partial ethers and partial esters of aliphatic polyhydroxy substances, the higher molecular weight aliphatic radical containing at least eight carbon atoms.

24. From water-soluble to water-dispersible chemical compounds of normally liquid to pasty consistency corresponding to those resulting from the interaction of acetic acid esters of aliphatic hydroxy polycarboxylic acid anhydrides with higher molecular weight unsaturated fatty acid partial esters of aliphatic polyhydroxy substances, the higher molecular weight unsaturated fatty acid radical containing at least eight carbon atoms.

FRANK J. CAHN.
BENJAMIN R. HARRIS.